United States Patent [19]

Shiraishi

[11] Patent Number: 4,880,984

[45] Date of Patent: Nov. 14, 1989

[54] SHEET-FORM RADIATION-MEASURING INSTRUMENT

[75] Inventor: Hisashi Shiraishi, Minami-ashigara, Japan

[73] Assignee: Fuji Photo Film Co., Ltd., Kanagawa, Japan

[21] Appl. No.: 73,877

[22] Filed: Jun. 15, 1987

Related U.S. Application Data

[63] Continuation of Ser. No. 614,670, May 29, 1984, abandoned.

[30] Foreign Application Priority Data

Jun. 10, 1983 [JP] Japan .................................. 58-103636

[51] Int. Cl.$^4$ .............................................. G01T 1/20
[52] U.S. Cl. .................................. 250/484.1; 250/364
[58] Field of Search ................... 250/364, 327.2, 484.1

[56] References Cited

U.S. PATENT DOCUMENTS

| 3,017,510 | 1/1962 | Roucayrol et al. | 250/364 |
| 3,134,018 | 5/1964 | Schranz | 250/364 |
| 3,288,995 | 11/1966 | Demorest | 250/364 |
| 4,127,499 | 11/1978 | Chen et al. | 250/483.1 |
| 4,336,154 | 6/1982 | Nishimura et al. | 250/327.2 A |
| 4,484,073 | 11/1984 | Ohara et al. | 250/327.2 |
| 4,562,158 | 12/1985 | Schellenberg | 250/361 R |

Primary Examiner—Carolyn E. Fields
Attorney, Agent, or Firm—Gerald J. Ferguson, Jr.

[57] ABSTRACT

A sheet-form radiation-measuring instrument for measuring radioactivity of a liquid sample, having a liquid-retaining member capable of retaining a liquid sample containing a radioactive substance, a transparent protective film of synthetic polymer material and a stimulable phosphor member containing a stimulable phosphor therein. The instrument may be in an integrate structure or a separate structure.

5 Claims, 1 Drawing Sheet

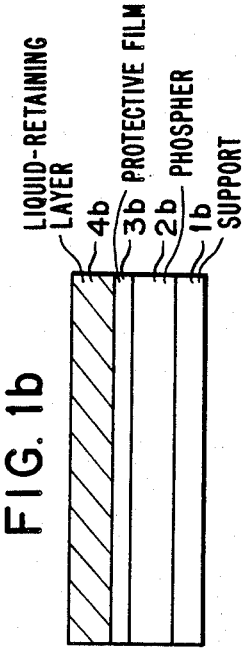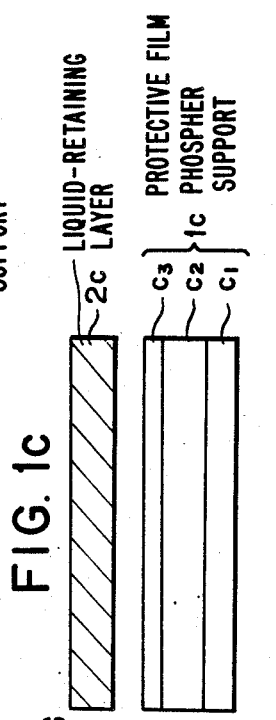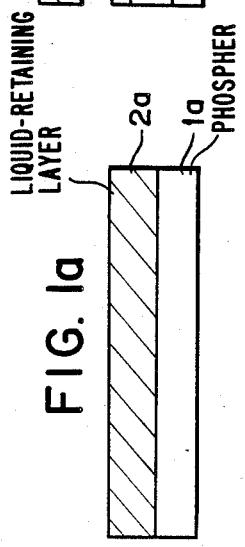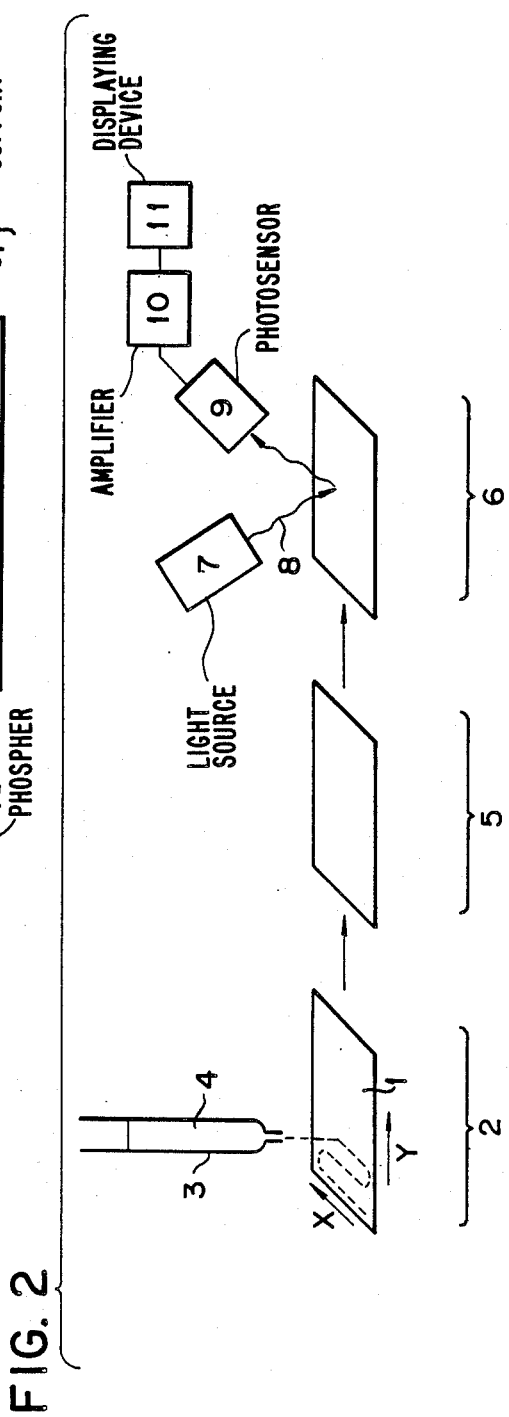

SHEET-FORM RADIATION-MEASURING INSTRUMENT

This application is a continuation of Ser. No. 614,670 filed May 29, 1984, now abandoned.

BACKGROUND OF THE INVENTION

1. Field of the Invention

The present invention relates to a radiation-measuring instrument, and more particularly, to a radiation-measuring instrument employing a stimulable phosphor.

2. Description of the Prior Art

Heretofore, as a method of measuring a radiation emitted by a liquid sample for detecting a radioactive substance (substance containing a radioisotope) contained therein, there are well known a liquid scintillation counting method wherein the radiation from the sample is converted into fluorescence to be detected by adding to the sample a liquid scintillator composed of a solute (fluorescent agent) dissolved in an organic solvent. In this method, the radioactivity of the radioactive substance contained in the sample is measured by causing the scintillator to absorb at least a portion of radiation energy emitted by the radioactive substance and detecting light (fluorescence) emitted by the scintillator.

The liquid scintillation counting method can be applied to the case where a liquid sample containing a radioactive substance can be continuously or intermittently supplied. The measurement of a radiation emitted by the sample is carried out by collecting a given amount of the sample and adding the liquid scintillator thereinto.

As a method for separation analysis, for example, there is known liquid chromatography wherein a sample solution is introduced into a column packed with a filler such as an adsorbent, an appropriate solvent is then supplied therethrough to develop the sample, and components in the sample are subsequently allowed to flow out from the column and collected. The liquid chromatography can be used for the separation of a sample containing a radioactive substance, and the separation and identification of the radioactive substance are conducted by measuring a radiation emitted by an eluate collected through the operation of the liquid chromatography.

More in detail, the separation and identification of a radioactive substance in a sample are conducted by collecting the sample containing the radioactive substance which is separated and developed in the liquid chromatography with a fraction collector, adding a liquid scintillator to each fraction, and then detecting light emitted by the scintillator with a photomultiplier to convert it into an electric pulse and counting the electric pulse to measure the radiation dose of each fraction.

The above-described liquid scintillation counting method has such an advantage that the radioactivity can be detected even when a radiation from a radioactive substance are weak ones such as $\alpha$-rays and $\beta$-rays, and is a useful means for measuring the radioactivity of the liquid sample.

However, when the liquid scintillation counting method is applied to a liquid sample containing a radioactive substance which is supplied continuously or intermittently from the above liquid chromatography, the radioactivity must be detected for every fraction by collecting the sample (which has been separated and developed in the liquid chromatography) by means of a fraction collector composed of a plurality of measuring containers (vials), and then measuring the radiation dose of each container with a scintillation counter.

Accordingly, in order to separate and identify the radioactive substance in the sample with higher accuracy by detecting the radioactivity of the separated and developed sample, it is required to use a greater number of measuring containers as the fraction collector. This means that the measuring procedures for collecting the sample solution and detecting the radioactivity become more complicated.

Further, the mechanism of scintillation in the liquid scintillation counting method is described as follows: A molecule of a solvent in which a solute (fluorescent agent) is dissolved in initialy excited by a radiation emitted by a radioactive substance in a liquid sample, and then a solute molecule (scintillator) is excited through impingement of the excited solvent molecule on the solute molecule, or the like. In the course of transferring of the radiation energy from the solvent molecule to the solute molecule, there occur other phenomena such that the energy is transferred between the solvent molecules by interaction between the solvent molecule in the excited state and that in the ground state, or that the energy is transferred from the solvent molecule in the excited state to the other solute molecule than a scintillator by interaction therebetween before the scintillator is excited. The transfer of energy takes place not only through the interaction between molecules such as impingement, but also through such a phenomenon that the scintillator absorbs light emitted by the excited solvent molecule or other excited solute molecule.

In the course of the energy-transfer procedure, however, there also occurs such a quenching phenomenon that the excitation energy is absorbed by a portion of the solvent molecules or other solute molecules so as to be converted into heat, etc., or that the light emitted by the scintillator is absorbed by a light-absorbing substance contained in the sample.

The liquid scintillator, which is essential to said liquid scintillation counting method, is expensive and has to be isolated and refined to re-use it. Usually, it is difficult to recover the scintillator in a high purity so that it is not generally re-used and the measuring cost is increased thereby. Further, there are problems in handling thereof. For example, the used scintillator containing the radioisotope may cause a problem in the disposal stage such as environmental pollution.

Other problems reside in that the solvents employable in conjunction the solutes (fluorescent agent) are generally limited to certain organic solvents so that there is difficulty in choosing a solvent for a sample, and specific procedure has to be taken in preparing a sample in the case that the sample is sparingly soluble in the solvent.

Since the scintillation mechanism of the liquid scintillator is complicated as stated above, the counting efficiency (that is, intensity of radioactivity to be detected) is apt to decrease by the quenching effect due to impurities contained in a sample or of the sample per se. For example, light emitted by the scintillator is liable to be quenched by the oxygen dissolved in the liquid scintillator, or to be absorbed (i.e. quenched) by a colorant in the case that the sample solution is colored thereby. In the case that a sample is sparingly soluble, it is not easy to prepare a sample solution in a homogeneous phase, and the unhomogeneous phase thereof causes internal absorption of a radiation emitted from the sample. For this reason, it is necessary to accurately determine the counting efficiency of the sample by making correction for quenching caused by the above-mentioned various phenomena, and this makes measuring procedure more complicated. Further, there is a disadvantage that it is substantially difficult to accurately measure the radioactivity of the sample even if the correction for quenching is made.

In order to prevent the counting efficiency from being lowered by quenching effect of contaminants, impurities and colored substances contained in the sample, the sample has to be carefully prepared, and high skill and much experience are required for the operators. The pretreatment of the sample to remove the contaminants is of importance to the measuring procedure.

In the conventional scintillation counting method, the measurement of radioactivity of a sample is conducted in a real time. Namely, it is necessary to continuously measure light emitted by the scintillator for a given time (for example, for several minutes to several ten minutes) after the sample is introduced into the scintillator solution. If the intensity of radiation from the sample is low, the measuring time (i.e., counting time) extends to a long time so that it can be hardly said that the measuring efficiency and the handling efficiency of measuring apparatus are sufficiently high. Therefore, in the case that a great number of samples are involved as described above, it is difficult to treat such a great number of samples once and the waiting period accordingly extends to many hours so that it disadvantageously takes a long time until the results are obtained. Particularly, in the case that the half-life of the radioisotope in the sample is short, it becomes difficult to measure the radioactivity thereof. Further, in the case that the radiation intensity is low, the measurement becomes more difficult. This means that an apparatus to be used (for example, againt dark current drift of photomultiplier) must be stable over a long period of time. To keep the stability of apparatus, an expensive apparatus becomes necessary, or much skill and experience to adjust the apparatus are required.

SUMMARY OF THE INVENTION

The present inventor has made studies to solve the above-mentioned problems associated with the conventional liquid scintillation counting method which has been employed for measuring radioactivity of a liquid sample containing a radioactive substance, and has found that said problems can be solved or reduced in the measurement of radioactivity of a liquid sample by using a sheet-form measuring instrument containing a stimulable phosphor therein and having a liquid-retaining property.

The present invention provides a sheet-form radiation-measuring instrument comprising a liquid-retaining member capable of retaining a liquid sample containing a radioactive substance and a stimulable phosphor member containing a stimulable phosphor.

In the sheet-form radiation-measuring instrument, the liquid-retaining member and the stimulable phosphor member, which are the essential structural members thereof, may be in an integrate form wherein both members are combined in a superposing state, or in a separate form wherein both members are independently arranged each other.

BRIEF DESCRIPTION OF DRAWINGS

FIGS. 1-(a) to 1-(c) are sectional views schematically showing embodiments of the radiation-measuring instrument of the present invention wherein:

(a) shows an integrated radiation-measuring instrument composed of a phosphor layer ($1a$) and a liquid-retaining layer ($2a$);

(b) shows an integrated radiation-measuring instrument composed of a support ($1b$), a phosphor layer ($2b$), a protective film ($3b$) and a liquid-retaining layer ($4b$); and (c) shows a separated radiation-measuring instrument composed of a stimulable phosphor sheet ($1c$) which comprises a support ($c_1$), a phosphor layer ($c_2$) and a protective film ($c_3$), and a liquid-retaining support medium ($2c$).

FIG. 2 is a schematic view showing an embodiment of a radiation-measuring system for detecting a radioactive substance contained in a liquid sample which continuously supplied dropwise.

DETAILED DESCRIPTION OF THE INVENTION

The stimulable phosphor used in the present invention has the property of emitting light (giving stimulated emission) when excited with an electromagnetic wave (stimulating rays) such as visible light or infrared rays after absorbing a radiation.

In the use of the sheet-form radiation-measuring instrument (separate type) of the present invention, the radioactivity of a liquid sample containing a radioactive substance can be measured, for example, in the following manner: The sample is introduced into the liquid-retaining member and the liquid-retaining member is then placed on the stimulable phosphor member for a given period of time to cause the stimulable phosphor member to absorb a radiation emitted by the radioactive substance. The stimulable phosphor member is separated from the liquid-retaining member and then irradiated with the stimulating rays to release the radiation energy stored in the phosphor member in proportion to the applied radiation dose as stimulated emission. The stimulated emission is photoelectrically read out (detected) and converted into an electric signal. In use of the integrated one, a radiation from the liquid sample introduced into the liquid-retaining member is immediately absorbed by the stimulable phosphor member superposed thereon.

The sheet-form radiation-measuring instrument of the present invention has both functions such as a function capable of retaining a liquid sample and a function capable of storing radiation energy given by the sample and releasing it as stimulated emission.

The sheet-form radiation-measuring instrument of the present invention is particularly suitable for use in the radiation measurement of a liquid sample containing a radioactive substance, which is intermittently or continuously supplied.

The supply of a liquid sample to the sheet-form radiation-instrument can be conducted, for example, as follows: The liquid-retaining member of the measuring instrument is horizontally placed under a sample supplier such as a separation column. Then the liquid-retaining member is horizontally moved in one direction (hereinafter referred to as X-direction), while the liquid sample from the supplier is allowed to drop or flow down continuously or intermittently, whereby the liquid sample is adsorbed and held in the form of a spot or band on the member. Just before one end of the liquid-retaining member exceeds the point onto which the sample drops, the direction of movement of the liquid-retaining member is altered in such a manner that the member moves still horizontally but shifts slightly to a direction perpendicular to the X-direction (hereinafter referred to as Y-direction), and the the liquid-retaining member is moved in the X-direction reversely. In this way, the liquid-retaining member is moved in conjunctio of the slight shift in the Y-direction and repeatedly advances to and from in the X-direction, so that the liquid sample can be retained in the form of a continuous or discontinuous band on the liquid-retaining member. It is apparent that other modifications can be made within the scope of the present invention.

After the stimulable phosphor member of the sheet-form measuring instrument is caused to absorb a radiation emitted by the liquid sample held in the band form on the liquid-retaining member, the phosphor member in which the radiation energy is stored is irradiated with appropriate stimulating rays, whereby the stored radiation energy can be sequentially read out in the form of stimulated emission. Thus, the above-described method can be applied to a sample which is separated and developed in the liquid chromatography and continuously flows out therethrough, and a radioactive substance in the sample separated and developed can be sequentially detected so as to separate and identify the radioactive substance with high accuracy.

The stimulable phosphor contained in the radiation-measuring instrument gives stimulated emission instantaneously and the photometric time of the emission can be set irrespectively of the radiation intensity of a sample, so that the read-out operation after introducing the sample to the measuring instrument to allow the instrument to store the radiation energy emitted by the sample takes such a short time as from several seconds to several tens seconds. Thus, the measuring time can be shortened.

Further, it is possible to carry out separately the storing operation of radiation energy into the stimulable phosphor member and the read-out operation thereof, by eliminating the sample held on the liquid-retaining member (or separating said member from the stimulable phosphor member in the case of the separated one), so that a plurality of the measuring instruments can be subjected to the read-out operation together. In this respect, the time required for the conventional measurement can be shortened and the measuring procedure can be simplified.

Accordingly, the working efficiency of the apparatus increases and the number of the measurement per a unit time can be increased. This means that the radioactivities of a great number of samples can be measured with high accuracy under the same conditions even when a radioisotope having a short half-life and a feeble radiation is involved. Further, when a plurality of the measuring instruments are used with only one measuring apparatus of the present invention, the measuring efficiency becomes substantially equal to that obtained in the case that a plurality of measuring apparatuses are used together in the conventional method.

It is furthermore possible to automate all the operations involved, that is, the moving operation of the sheet-form measuring instrument under a sample supplier, the depositing operatioon of the sample on the instrument, the storing operation of radiation from the sample into the instrument and the read-out operation of the radiation energy stored therein, so that the total workability can be more improved.

The sheet-form measuring instrument of the present invention does not employ the conventional scintillator and comprises a material such as plastics, so as to be easily handled. Further, when the measuring instrument is a separate type, the stimulable phosphor member is separated from the liquid-retaining member afte rthe storing operation of the radiatio energy or after use, and the used phosphor member is irradiated with an appropriate light to erase the radiation energy remaining therein, so that the measuring instrument can be repeatedly used and the cost for one measurement can be reduced.

Further, a solvent is not necessarily employed for measuring radioactivity by using the measuring instrument of the present invention, which is different from the conventional liquid scintillation counting method. That is, the selection of an appropriate solvent and the preparation of a sample solution required in the use of the liquid scintillator are not always required. Further, the above-mentioned quenching phenomena, particularly such as the phenomenon of quenching of the emitted light does not occur in the case of using the measuring instrument of the present invention. It is not necessary to introduce any complicated quenching correction (determination of counting efficiency) for measuring the radioactivity of the sample, and the radioactivity thereof can be accurately measured without being greatly influenced by the measuring conditions, etc. Accordingly,t he measuring procedure is more simplified in this respect.

Since it is not particularly necessary to remove impurities, etc. contained in the sample, the pretreatment of the sample as stated hereinbefore is not required, and much skill and attention based on the experience are not required for the preparation of the sample. The measurement of the radioactivity of the sample can be easily made further by this feature.

The following illustrates the sheet-form radiation-measuring instrument of the present invention in more detail.

The integrate radiation-measuring instrument of the present invention basically comprises a stimulable phosphor member in the form of a phosphor layer containing a stimulable phosphor therein and a liquid-retaining member in the form of a liquid-retaining layer provided on said phosphor layer. For example, the radiation-measuring instrument can be prepared in the following manner.

The phosphor layer, for example, comprises a binder and a stimulable phosphor dispersed therein.

The stimulable phosphor, as described hereinbefore, gives stimulated emission when excited with stimulating rays after exposure to a radiation. From the viewpoint of practical use, the stimulable phosphor is desired to give stimulated emission in the wavelength region of 300–500 nm when excited with stimulating rays in the wavelength region of 400–850 nm.

Examples of the stimulable phosphor employable in the method of the present invention include:

$SrS:Ce,Sm$, $SrS:Eu,Sm$, $ThO_2:Er$, and $La_2O_2S:Eu,Sm$, as described in U.S. Pat. No. 3,859,527;

$ZnS:Cu,Pb$, $BaO \cdot xAl_2O_3:Eu$, in which x is a number satisfying the condition of $0.8 \leq X \leq 10$, and $M^{2+}O \cdot xSiO_2:A$, in which $M^{2+}$ is at least one divalent metal selected from the group consisting of Mg, Ca, Sr, Zn, Cd and Ba, A is at least one element selected from the group consisting of Ce, Tb, Eu, Tm, Pb, Tl, Bi and Mn, and x is a number satisfying the condition of $0.5 \leq x \leq 2.5$, as described in U.S. Pat. No. 4,326,078;

$(Ba_{1-x-y},Mg_x,Ca_y)FX:aEu^{2+}$, in which X is at least one element selected from the group consisting of Cl and Br, x and y are numbers satisfying the conditions of $0 < x+y \leq 0.6$, and $xy \neq 0$, and a is a number satisfying the condition of $10^{-6} \leq a \leq 5 \times 10^{-2}$, as described in Japanese Pat. Provisional Publication No. 55(1980)-12143;

LnOX:xA, in which Ln is at least one element selected from the group consisting of La, Y, Gd and Lu, X is at least one element selected from the group consisting of Cl and Br, A is at least one element selected from the group consisting of Ce and Tb, and x is a number satisfying the condition of $0 < x < 0.1$, as described in the above-mentioned U.S. Pat. No. 4,326,078;

$(Ba_{1-x},M^{II}_x)FX:yA$, in which $M^{II}$ is at least one divalent metal selected from the group consisting of Mg, Ca, Sr, Zn and Cd, X is at least one element selected from the group consisting of Cl, Br and I, A is at least one element selected from the group consisting of Eu, Tb, Ce, Tm, Dy, Pr, Ho, Nd, Yb and Er, and x and y are numbers satisfying the conditions of $0 \leq x \leq 0.6$ and $0 \leq y \leq 0.2$, respectively, as described in Japanese Pat. Provisional Publication No. 55(1980)-12145;

$M^{II}FX \cdot xA:yLn$, in which $M^{II}$ is at least one element selected from the group consisting of Ba, Ca, Sr, Mg, Zn and Cd; A is at least one compound selected from the group consisting of BeO, MgO, CaO, SrO, BaO, ZnO, $Al_2O_3$, $Y_2O_3$, $La_2O_3$, $In_2O_3$, $SiO_2$, $TiO_2$, $ZrO_2$, $GeO_2$, $SnO_2$, $Nb_2O_5$, $Ta_2O_5$ and $ThO_2$; Ln is at least one element selected from the group consisting of Eu, Tb, Ce, Tm, Dy, Pr, Ho, Nd, Yb, Er, Sm and Gd; X is at least one element selected from the group consisting of Cl, Br and I; and x and y are numbers satisfying teh conditions of $5 \times 10^{-5} \leq x \leq 0.5$ and $0 < y \leq 0.2$, respectively, as described in Japanese Pat. Provisional Publication No. 55(1980)-160078;

$(Ba_{1-x},M^{II}_x)F_2 \cdot aBaX_2:yEu,zA$, in which $M^{II}$ is at least one element selected from the group consisting of Be, Mg, Ca, Sr, Zn and Cd; X is at least one element selected from the group consisting of Cl, Br and I; A is at least one element selected from the group consisting of Zr and Sc; and a, x, y and z are numbers satisfying the conditions of $0.5 \leq a \leq 1.25$, $0 \leq x \leq 1$, $10^{-6} \leq y \leq 2 \times 10^{-1}$, and $0 < z \leq 10^{-2}$, respectively, as described in Japanese Pat. Provisional Publication No. 56(1981)-116777;

$(Ba_{1-x},M^{II}_x)F_2 \cdot aBaX_2:y Eu,zB$, in which $M^{II}$ is at least one element selected from the group consisting of Be, Mg, Ca, Sr, Zn and Cd; X is at least one element selected from the group consisting of Cl, Br and I; and a, x, y and z are numbers satisfying the conditions of $0.5 \leq a \leq 1.25$, $0 \leq x \leq 1$, $10^{-6} \leq y \leq 2 \times 10^{-1}$, and $0 < z \leq 2 \times 10^{-1}$, respectively, as described in Japanese Pat. Provisional Publication No. 57(1982)-23673;

$(Ba_{1-x},M^{II}_x)F_2 \cdot aBaX_2:yEu,zA$, in which $M^{II}$ is at least one element selected from the group consisting of Be, Mg, Ca, Sr, Zn and Cd; X is at least one element selected from the group consisting of Cl, Br and I; A is at least one element selected from the group consisting of As and Si; and a, x, y and z are numbers satisfying the conditions of $0.5 \leq a \leq 1.25$, $0 \leq x \leq 1$, $10^{-6} \leq y \leq 2 \times 10^{-1}$, and $0 < z \leq 5 \times 10^{-1}$, respectively, as described in Japanese Pat. Provisional Publication No. 57(1982)-23675;

$M^{III}OX:xCe$, in which $M^{III}$ is at least one trivalent metal selected fromt he group consisting of Pr, Nd, Pm, Sm, Eu, Tb, Dy, Ho, Er, Tm, Yb, and Bi; X is at least one element selected from the group consisting of Cl and Br; and x is a number satisfying the condition of $0 < x < 0.1$, as described in Japanese Pat. Provisioal Publication No. 58(1983)-69281;

$Ba_{1-x}M_{x/2}L_{x/2}FX:yEu^{2+}$, in which M is at least one alkali metal selected from the group consisting of Li, Na, K, Rb and Cs; L is at least one trivalent metal selected from the group consisting of Sc, Y, La, Ce, Pr, Nd, Pm, Sm, Gd, Tb, Dy, Ho, Er, Tm, Yb, Lu, Al, Ga, In and Tl; X is at least one halogen selected from the group consisting of Cl, Br and I; and x and y are numbers satisfying the conditions of $10^{-2} \leq x \leq 0.5$ and $0 < y \leq 0.1$, respectively, as described in Japanese Pat. Provisional Publication No. 58(1983)-206678;

$BaFX \cdot xA:yEu^{2+}$, in which X is at least one halogen selected from the group consisting of Cl, Br and I; A is at least one fired product of a tetrafluoroboric acid compound; and x and y are numbers satisfying the conditions of $10^{-6} \leq x \leq 0.1$ and $0 < y \leq 0.1$, respectively, as described in Japanese Pat. Provisional Publication No. 59(1984)-27980;

$BaFX \cdot xA:yEu^{2+}$, in which X is at least one halogen selected from the group consisting of Cl, Br and I; A is at least one fired product of a hexafluoro compound selected from the group consisting of monovalent and divalent metal salts of hexafluoro silicic acid, hexafluoro titanic acid and hexafluoro zirconic acid; and x and y are numbers satisfying the conditions of $10^{-6} \leq x \leq 0.1$ and $0 < y \leq 0.1$, respectively, as described in Japanese Pat. Provisional Publication No. 59(1984)-47289;

$BaFX \cdot xNaX':aEu^{2+}$, in which each of X and X' is at least one halogen selected from the group consisting of Cl, Br and I; and x and a are numbers satisfying the conditions of $0 < x \leq 2$ and $0 < a \leq 0.2$, respectively, as described in Japanese Pat. Provisional Publication No. 59(1984)-56479;

$M^{II}FX \cdot xNaX':yEu^{2+}:zA$, in which $M^{II}$ is at least one alkaline earth metal selected from the group consisting of Ba, Sr and Ca; each of X and X' is at least one halogen selected from the group consisting of Cl, Br and I; A is at least one transition metal selected from the group consisting of V, Cr, Mn, Fe, Co and Ni; and x, y and z are numbers satisfying the conditions of $0 < x \leq 2$, $0 < y \leq 0.2$ and $0 < z \leq 10^{-2}$, respectively, as described in Japanese Pat. Provisional Publication No. 59(1984)-56480; and $M^{II}FX \cdot aM^IX' \cdot bM'^{II}X''_2 \cdot cM^{III}X'''_3 \cdot xA:yEu^{2+}$, in which $M^{II}$ is at least one alkaline earth metal selected from the group consisting of Ba, Sr and Ca; $M^I$ is at least one alkali metal selected from the group consisting of Li, Na, K, Rb and Cs; $M'^{II}$ is at least one divalent metal selected from the group consisting of Be and Mg; $M^{III}$ is at least one trivalent metal selected from the group consisting of Al, Ga, In and Tl; A is at least one metal oxide; X is at least one halogen selected from the group consisting of Cl, Br and I; each of X', X'' and X''' is at least one halogen selected from the group consisting of F, Cl, Br and I; a, b and c are numbers satisfying the conditions of $0 \leq a \leq 2$, $0 \leq b \leq 10^{-2}$, $p \leq c \leq 10^{-2}$ and $a+b+c \geq 10^{-6}$; and x and y are numbers satisfying the conditions of $0 < x \leq 0.5$ and $0 < y \leq 0.2$, respectively, as described in Japanese Pat. Application No. 57(1982)-184455.

The above-described stimulable phosphors are given by no means to restrict the stimulable phosphor employable in the present invention. Any other phosphor gives stimulated emission when excited with stimulating rays after exposure to a radiation.

Examples of the binder include: natural polymers such as proteins (e.g. gelatin), polysaccharides (e.g. dextran) and gum arabic; and synthetic polymers (i.e., plastics) such as polyvinyl butyral, polyvinyl acetate, nitrocellulose, ethylcellulose, vinylidene chloride-vinyl chloride copolymer, polymethyl methacrylate, vinyl chloride-vinyl acetate copolymer, polyurethane, cellulose acetate butyrate, polyvinyl alcohol and linear polyester. Particularly preferred are nitrocellulose, linear polyester, and the mixture of nitrocellulose and linear polyester.

The phosphor layer can be prepared, for example, in the following manner: The above-mentioned stimulable phosphor and the binder are added to an appropriate solvent (such as a lower alcohol, a chorinated hydrocarbon, a ketone, an ester or an ether) and they are sufficiently mixed to prepare a coating dispersion.

The ratio between the binder and the phosphor in the coating dispersion may be determined according to the shape of the aimed measuring instrument and the nature of the phosphor employed. Generally, the ratio therebetween is within the range of from 1:1 to 1:100 (binder: phosphor, by weight), preferably from 1:8 to 1:40.

The coating dispersion may contain a dispersing agent to assist the dispersibility of the phosphor particles therein, and also contain a variety of additives such as a plasticizer for increasing the bonding between the binder and the phosphor particles in the phosphor layer.

The so-prepared coating dispersion is coated on a sheet such as glass plate, metal plate or plastic sheet to form a layer of coating dispersion. The coating procedure can be conducted by means of a doctor blade, a roll coater, a knife coater, etc. Then, the coating dispersion applied to the sheet is heated slowly to dryness so as to complete the formation of a phosphor layer. The thickness of the phosphor layer varies depending upon the kind and inensity of an applied radiation, the nature of the phosphor, the ratio between the binder and the phosphor, etc. Generally, the thickness of the phosphor layer is within the range of from 20 $\mu$m to 1 mm, preferably from 50 to 500 $\mu$m.

In the present invention, it is preferred that a transparent protective film is provided on the surface of the phosphor layer to receive a liquid-retaining layer, to protect the phosphor layer from chemical deterioration and physical shocks. Examples of the material employable for the protective film include synthetic polymer materials such as polymethyl methacrylate, polyvinyl butyral, polyvinyl formal, polycarbonate, polyvinyl acetate, vinyl chloride-vinyl acetate copolymer, polyethylene terephthalate, polyethylene, polyvinylidene chloride and polyamide. The protective film can be formed on the phosphor layer by coating a solution of the material thereon or by fixing its film thereonto with an adhesive agent. The transparent protective film preferably has a thickness within a range of approximately 0.1 to 20 $\mu$m.

On another surface of the phosphor layer, a support may be provided, which is made of a plastic material such as cellulose acetate, polyester, polyethylene terephthalate; a metallic sheet such as aluminium foil; or a paper such as baraita paper or resin-coated paper. The support can be provided by directly forming the phosphor layer thereon or by fixing it onto the phosphor layer with an adhesive agent.

In the case of reading out the measuring instrument from the support side, it is preferred that the support is made of a transparent plastic material. The provision of the support onto the phosphor layer can bring about the enhancement of the mechanical strength and durability of a measuring instrument to be obtained.

It is not always necessary that the phosphor layer is formed by coating the dispersion of the stimulable phosphor and the binder. For example, the phosphor layer may be formed by depositing phosphor particles on the support by vacuum-deposition.

The liquid-retaining layer is then formed on one side of the phosphor layer (or on the surface of the protective film in the case that it is provided on the phosphor layer).

It is preferred that the liquid-retaining layer has such a functiion that when the liquid sample is spotted on said layer, the sample is spread on the surface of said layer in proportion to the spotted amount and at the same time, the sample is caused to soak through said layer so that a substantially uniform amount of the sample per the unit area of the liquid-retaining layer can be held.

As materials for the liquid-retaining layer having such a function, there are used, for example, a porous structure capable of adsorbing and holding the liquid sample by physical mechanism such as capillarity. Examples of the porous structure include fibrous materials such as a paper (e.g., filter paper) and fabrics (e.g., gauze); and non-fibrous materials such as porous polymers, porous glass and glass-like materials. In addition, there may be used materials which can be swollen by the solvent of the sample solution, thereby can absorb the sample solution.

In the case that the solvent is a hydrophilic one such as water, there may be used, as materials for the liquid-retaining layer, natural polymer materials such as gelatin, starch, agarose, cellulose, and their derivatives; and synthetic polymer materials such as synthetic homopolymers (for example, polyvinyl alcohol, polyvinyl pyrrolidone, polyacrylamide, polyhydroxyethyl methacrylate) and synthetic copolymers resulting from the copolymerization of a hydrophilic monomer having a hydrophilic group such as hydroxyl group or carboxyl group with a hydrophobic monomer (for example, unsaturated ethylenic monomers such as ethylene, propylene, styrene, methacrylate, acrylate, vinyl chloride, vinylidene chloride and dienes such as butadiene, isoprene, isobutylene, etc.). In the case of a lipophilic solvent, examples of the material of the liquid-retaining layer include synthetic polymer materials such as nylon, polyethylene, polystyrene, polyester, in addition to those described above.

The formation of the liquid-retaining layer on the phosphor layer can be made, for example, by any of known layer-forming methods such as a method of coating the surface of the phosphor layer with a solution of the above material dissolved in water or other solvent, or a latex dispersion.

In order to prevent the deposited liquid sample from spreading in the lateral direction exceeding a given width, there may be provided partition having an appropriate size and shape made of an appropriate plastic or metal filament or lattice or net structure grid. The liquid-retaining layer may be composed of single layer or a plurality of layers in the laminated form.

The thickness of the liquid-retaining layer varies depending upon the amount and kind of a radioactive substance in the sample, the kind of the solvent of the sample, and is preferable within the range of about 1 μm to 10 mm.

When the read-out operation of the measuring instrument is carried out from the side of the liquid-retaining layer, it is preferred that said layer is transparent from the viewpoints of light-transmissivity for stimulating rays and stimulated emission.

Further, in order to increase adhesion between the liquid-retaining layer and the phosphor layer (or the protective film), the surface of the phosphor layer (or the protective film) may be subjected to various activation treatment. Examples of such activation treatments include chemical treatments with a reagent such as acid, alkali or etching agent; a physical treatment such as a roughing treatment; electrical treatments such as corona discharge, high-frequency discharge, glow discharge, activated-plasma discharge; a treatment with ultraviolet rays or laser beam; a flame treatment; an oxidation treatment with ozone; and the like.

The side-surface of the sheet-form measuring instrument may be covered with a polymer covering material such as polyurethane or acrylic resin, to increase the mechanical strength of the obtained measuring instrument.

The sheet-form measuring instrument of the present invention may be in an arbitrary form of a quadrangle, a circle or an oval having an appropriate size according to the measuring conditions of measuring system, the amount and the radioactivity of the sample, etc.

The sheet-form radiation-measuring instrument of the present invention may be a separated one, which comprises a liquid-retaining member in the form of a liquid-retaining support medium for holding and adsorbing a liquid sample and a stimulable phosphor member in the form of a stimulable pohosphor sheet for storing the radiation energy emitted by the sample and then releasing said energy as stimulated emission.

In the separate-type mesuring instrument, the stimulable phosphor sheet has a basic structure comprising the above-mentioned support and phosphor layer provided thereon which is composed of a binder and a stimulable phosphor dispersed therein. Further, it is preferred that the afore-mentioned protective film is provided on the opposite surface (surface not facing the support) of the phosphor layer to protect the phosphor layer from chemical deterioration or physical shock.

The liquid-retaining support which is the other structural member of the separated measuring instrument can be formed using the same materials as those used for the aforementioned liquid-retaining layer. A supporting auxiliary element such as glass sheet or a plastic sheet may be provided on this liquid-retaining member.

The following illustrates typical emobidments of the sheet-form radiation-measuring instrument of the present invention, referring to the accompanying drawings. FIG. 1-(a) to (c) are sectional views schematically showing embodiments of the measuring instrument of the present invention.

(1) FIG. 1-(a) shows an integrate sheet-form measuring instrument composed of a phosphor layer (1a) and a liquid-retaining layer (2a);

(2) FIG. 1-(b) shows an integrate sheet-form measuring instrument composed of a support (1b), a phosphor layer (2b), a protective film (3b) and a liquid-retaining layer (4b), superposed in this order; and (3) FIG. 1-(c) shows a separated sheet-form measuring instrument composed of a stimulable phosphor sheet (1c) consisting of a support ($c_1$), a phosphor layer ($c_2$) and a protective film ($c_3$), superposed in this order, and a liquid-retaining support medium (2c).

The above-mentioned three embodiments are provided to illustrate only typical embodiments, but are not to be construed as limiting the radiation-measuring instrument of the present invention in any way.

A method for detecting a radioactive substance by using the sheet-form radiation-measuring instrument containing the stimulable phosphor of the present invention will be briefly described, referring to an embodiment shown in FIG. 2.

FIG. 2 schematically shows an embodiment of a radiation-measuring system for detecting a radioactive substance contained in a liquid sample which is allowed to drop continuously.

Samples to be measured in the present invention are liquid samples containing radioactive substances, which may be solutions or dispersionos, and may be colored.

As radiations emitted by radioactive substances in the samples, any radiations such as $\alpha$-rays, $\beta$-rays, $\gamma$-rays, proton beam, neutron beam, meson beam, cosmic rays and other rays can be measured. Namely, any radiations emitted by any radionuclides can be measured.

In a sample-supplying (sample-depositing) section 2, a liquid sample 4 is allowed to drop from the bottom of a sample supplier 3 onto a liquid-retaining layer of an integrate measuring instrument 1. The measuring instrument 1 is moved in the direction of arrows X and Y as mentioned before, while allowing the liquid sample 4 to drop thereon. With the movement of the instrument 1, the sample is deposited on the instrument 1 in a continuous or discontinuous band form thereon, adsorbed and held by the liquid-retaining layer thereof.

In a radiation energy-storage section 5, at least a portion of the radiatioon energy emitted by a radioactive substance in the sample held by the liquid-retaining layer of the measuring instrument 1 is absorbed by the phosphor layer of the measuring instrument 1, and stored therein. The storing time of radiation energy varies depending on the intensity of a radiation emitted by the radioactive substance in the sample, the concentration of said substance, the shape of the measuring instrument, the intensity of stimulated emission from the instrument, etc. The storing time usually ranges from about 1 sec. to 1 min. The drying of the sample on the measuring instrument 1 may be simultaneously conducted in the storage section 5 by warming the instrument 1 or the like.

In a read-out section 6, the measuring instrument 1 is irradiated with stimulating rays 8 radiating from a light source 7. It is preferred that the stimulating rays 8 has a beam diameter of at least a size corresponding to the width of the band of the deposited sample. When the phosphor layer of the measuring instrument 1 is irradiated with stimulating rays, the phosphor layer emits light being proportional to the radiation energy stored therein. Then, the emitted light enters a photosensor 9 such as photomultiplier. The photosensor 9 is provided with such a filter that allows only light in the wavelength region of the stimulated emission to pass therethrough and cuts off light in the wavelength region of the stimulating rays, so as to detect only the stimulated emission. The emitted light detected by the photosensor 9 is converted into an electric signal, which is then amplified to an appropriate level by an amplifier 10 and input into a recording or displaying device 11.

On the device 11, the level of the electric signal corresponding to the radiation dose absorbed by the measuring instrument, for example, the counted value of an electric pulse is displayed as a digital value. As the recording or displaying device 11, various devices based on various systems can be employed, for example, a device for optically recording by scanning a photosensitive material with laser beam, etc., a device for electronically displaying on CRT, etc., a device for printing a radiation image displayed on CRT by means of a video printer, and a device for recording on a heat-sensitive recording material by using thermic rays.

It is possible that the intensity of radioactivity is calculated on the basis of the resulting digital value according to read-out efficiency (luminance efficiency of stimulated emissio) previously input and the storing time of radiation energy, by providing a data processing circuit within the device 11. Further, by inputting the intensity of radioactivity per 1 mole of the radioactive substance, the amount or the concentration of the radioactive substance for each sample-deposited part (or each pixell for reading out the stimulated emission) can be calculated and then the resulting data can be displayed and recorded.

In the operation for depositing the liquid sample continuously supplied from the sample supplier on the sheet-form measuring instrument, the moving method of the measuring instrument is not limited to the go-and-back movement in conjunction with of the shift movements in the X- and Y-directions as mentioned before, but other suitable methods may be also used. For example, the measuring instrument may be horizontally rotated with causing continuous slight shift of its center. In this case, the sample is adsorbed and held in a swirl form on the measuring instrument.

Further, the operation for reading out the radiation energy of the sample stored in the measuring instruments containing the stimulable phosphor has been described in detail, but it will be understood that modifications can be made and another operation than that exemplified above can be used. It is also possible that the measuring instrument without the liquid-retaining member (i.e., the stimulable phosphor member) can be subjected to the read-out operation by separating liquid-retaining member therefrom prior to the read-out operation.

The method for detecting the radioactive substance using the radiation-measuring instrument of the present invention is not limited to that described above, but other methods may be used. For example, the sample portions from which the radioactive substance is detected can be collected on the basis of the resulting data, so that the desired radioactive substnace can be efficiently separated. Further, it is possible to entirely automate all the procedures such as the measuring procedure by controlling the continuous operations comrising the depositing operation of the liquid sample on the measuring instrument, the storing operation for storing the measuring instrument with radiation energy and the reading-out operation of the measuring instrument.

In the case of using the separate sheet-form measuring instrument, the detection of a radioactive substance in a liquid sample can be carried out in the following manner: The depositing operation of the sample is first done against the liquid-retaining support medium, the support medium holding the sample is placed on the stimulable phosphor sheet to do the storing operation of the radiation energy into the sheet. After the stimulable phosphor sheet is separated from the liquid-retaining support medium and if desired, the sheet is washed with a solvent, the read-out operation is done against the stimulable phosphor sheet. However, it is also possible that the depositing operation and read-out operation are conducted against the measuring instrument in the state wherein the liquid-retaining support medium is placed over the stimulable phosphor sheet.

It is possible to re-use the radiation-measuring instrument by washing the instrument with an appropriate solvent to remove the sample deposited thereon and irradiating it with light to erase the remaining energy therein. The measuring instrument can be effectively used for the detection of a radioactive substance. Particularly, the separate measuring instrument is advantageous in practical use in respect of being capable of repeatedly using only the stimulable phosphor member.

The method of detecting a radioactive substance using the radiation-measuring instrument of the present invention is preferably applied to the case of measuring of a small amount of liquid sample supplied continuously, and it is possible to detect the radioactive substance contained in the sample with high accuracy and in short time. Particularly, the method is applied to liquid samples separated and developed in a column, and radioactive substances in the samples can be separated and identified with high accuracy.

I claim:

1. A sheet-form radiation measuring instrument means for measuring radioactivity of a liquid sample, said instrument means comprising, in order, a liquid-retaining member having a porous structure, a transparent protective film of synthetic polymer material, and a stimulable phosphor member containing a stimulable phosphor.

2. The sheet-form radiation-measuring instrument means as claimed in claim 1, wherein said stimulable phosphor member is composed of a binder and a stimulable phosphor dispersed therein.

3. The sheet-form radiation-measuring instrument means as claimed in claim 1, wherein said liquid-retaining member, protective film and the stimulable phosphor member are integrated to form a laminated structure.

4. The sheet-form radiation-measuring instrument means as claimed in claim 1, wherein said liquid-retaining member and the protective film member are separated from each other.

5. The sheet-form radiation-measuring instrument means as claimed in claim 2, wherein the stimulable phosphor is a divalent europium activated alkaline earth metal fluorohalide phosphor.

* * * * *